United States Patent [19]
Heyl

[11] Patent Number: 4,572,534
[45] Date of Patent: Feb. 25, 1986

[54] FRONT WHEEL SUSPENSION FOR MOTORCYCLES

[75] Inventor: Gerrit Heyl, Munich, Fed. Rep. of Germany

[73] Assignee: Bayerische Motoren Werke Aktiengesellschaft, Fed. Rep. of Germany

[21] Appl. No.: 539,569

[22] Filed: Oct. 6, 1983

[30] Foreign Application Priority Data

Oct. 9, 1982 [DE] Fed. Rep. of Germany ....... 3237579

[51] Int. Cl.⁴ .............................................. B62K 25/08
[52] U.S. Cl. .................................. 280/276; 188/272; 280/703
[58] Field of Search ............... 280/276, 277, 703, 701, 280/709, 710, 711, 712, 713, 714, 715, 697, 698; 180/218, 219, 282; 188/272

[56] References Cited

U.S. PATENT DOCUMENTS

| 3,774,935 | 11/1973 | Aldrich | 280/703 |
| 3,989,261 | 11/1976 | Kwaguchi | 280/276 |
| 4,153,266 | 5/1979 | Uhls | 280/276 |
| 4,159,123 | 6/1979 | Petty | 280/276 |
| 4,367,882 | 1/1983 | Alexander et al. | 280/276 |

FOREIGN PATENT DOCUMENTS 2052407 1/1981 United Kingdom .
82/00445 1/1981 PCT Int'l Appl. .

Primary Examiner—Joseph F. Peters, Jr.
Assistant Examiner—Charles R. Watts
Attorney, Agent, or Firm—Craig & Burns

[57] ABSTRACT

A front wheel suspension for a motorcycle in which the nose-diving during braking is reduced; for that purpose, an auxiliary spring is additionally connected with the spring element of the spring system during the braking operation. In a preferred embodiment, brake means act on a bolt which in turn supports a thrust rod stressing the auxiliary spring during the braking.

21 Claims, 1 Drawing Figure

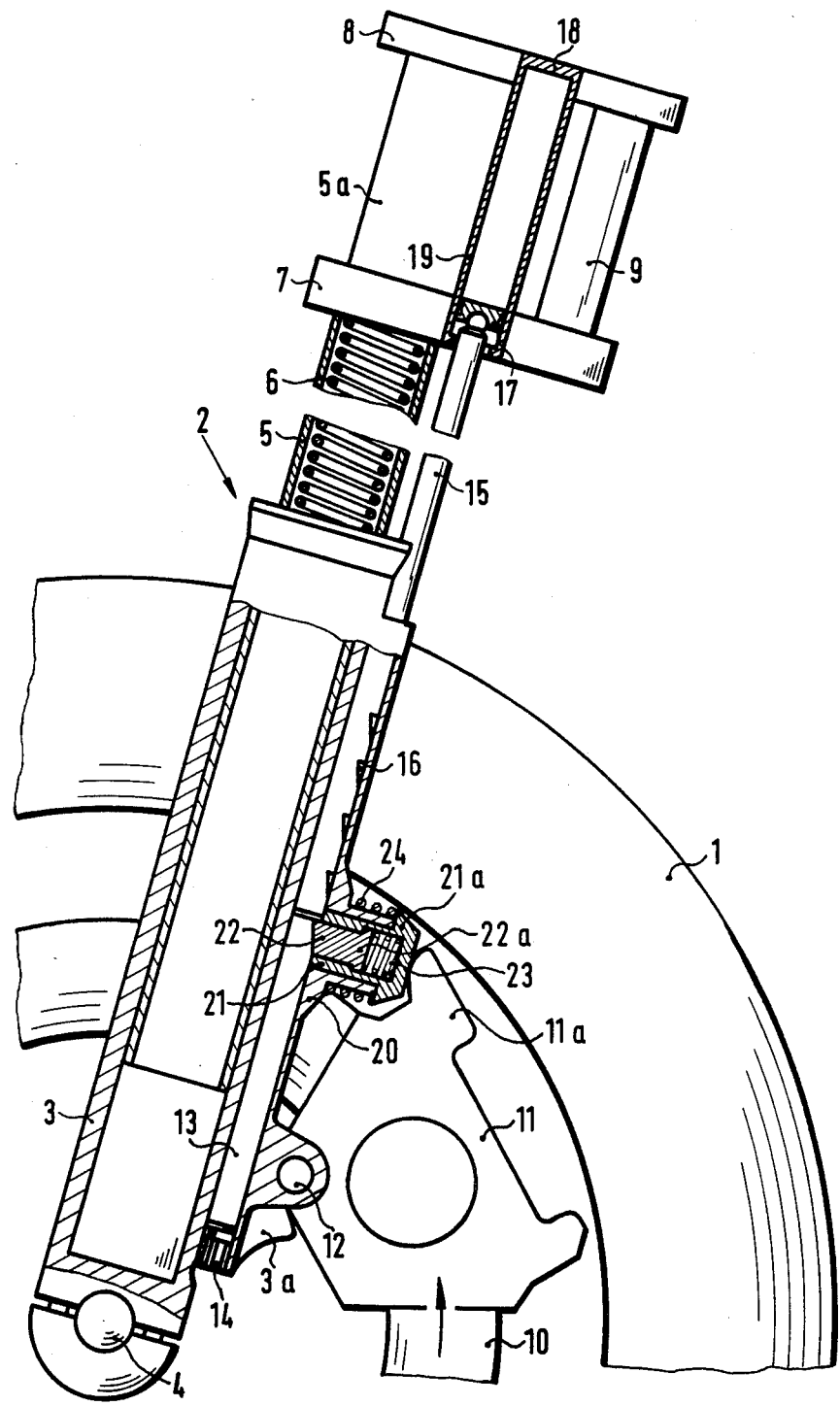

FRONT WHEEL SUSPENSION FOR MOTORCYCLES

The present invention relates to a front wheel suspension for motorcycles in which the front wheel is supported at the steering head of the motorcycle by way of at least one spring element and in which means are provided for braking the front wheel.

The purpose of such a front wheel suspension resides in reducing the nose-diving of the front wheel during braking. Generally this is designated by the term "anti-dive". An anti-dive installation for a front wheel suspension is disclosed in the International Application WO 82/00445. In this application, the front wheel includes a disk brake with a brake caliper pivotal about the wheel axis. During the braking operation, the brake caliper presses on a piston of a hydraulic system causing a build up of pressure. The building-up pressure stresses the spring of the suspension by way of a piston. The thus-prestressed spring counteracts the force causing the nose-diving and partially equalizes the same. The prestress of the spring thereby proceeds proportionally to the applied brake moment. In order to reduce effectively the nose-diving, high pressures are necessary in the hydraulic system. To control the same requires a large structural expenditure which still further increases the costs of the already expensive construction.

It is the aim of the present invention to effectively reduce by simple means in a front wheel suspension of the type described above, the nose-diving of the front wheel during the braking.

The underlying problems are solved according to the present invention in that during a braking operation an auxiliary spring is additionally connected with the spring element by way of the actuating elements.

The spring rate of the entire spring system changes as a result of the additionally connected auxiliary spring. The spring system becomes stiffer. It is particularly advantageous if a pneumatic spring is used as auxiliary spring. In this case the spring rate of the pneumatic spring and therewith the entire spring rate of the suspension increases progressively with the inward spring travel and finally becomes infinite. One obtains thereby a soft abutment during extreme nose-diving.

The present invention can be realized in principle with all known front wheel suspensions. However, it can be used in a preferred manner with a suspension having a front wheel fork, in which the fork legs are constructed as telescopic shock absorbers. The thrust rod thereby slides in a guidance which is provided at one of the slide tubes and extends in parallel to the longitudinal axis of the tubular member. The guidance can be constructed in a particularly simple manner as a bore in the wall of the tubular slide member. The pipe-flanged shaped stub for the bolt can then be made in one piece with the tubular slide member. Altogether one obtains thereby a compact and simple type of construction. Of course, it is also possible to provide one thrust rod each at the tubular slide member of each fork leg which can then act on one or several auxiliary springs.

Customarily disk brakes are used as braking means for the front wheel. According to the present invention, the brake caliper is then rotatably supported at the tubular slide member and presses with a finger-like extension either directly or indirectly on the bolt. Depending on the size, the motorcycle includes a disk brake either on one or on both sides of the front wheel. This, however, is of no importance for the present invention as can be readily appreciated. The present invention is not limited to disk brakes but any type of vehicle brake in which during the braking operation, one of the parts thereof can act on the bolt, is suitable therefor.

It is advantageous if the brake caliper does not press directly on the bolt but presses by way of a sleeve spring-supported with respect to the tubular slide member, in which the bolt is guided against the spring loading. As a result thereof, the bolt is able to move relative to the sleeve notwithstanding an applied brake and is able to release the thrust rod. This may become necessary when the front wheel seeks to spring-deflect outwardly notwithstanding an actuated brake. For this purpose, the thrust rod includes saw-tooth-like notches with downwardly pointing teeth, into which engages the bolt. If the front wheel seeks to spring-deflect outwardly, it will pull the thrust rod upwardly and the inclined surfaces of the saw-tooth force the bolt back so that it will finally release the thrust rod.

After the termination of the braking operation, the sleeve will pull back the bolt into its original position as a result of its springy support at the tubular slide member. It thereby also forces the brake caliper into its original position which is determined by an abutment provided at the tubular slide member.

In order to prevent the thrust rod from snapping back by the energy stored in the auxiliary spring, it is advantageous to dampen this movement by an air cushion or by some other elastic abutment. The air cushion can be attained in a simple manner by having the discharge cross section for the air at the other end of the guidance reduced.

Depending on construction and design of the auxiliary spring, the nose-diving is reduced up to about 40%. The system according to the present invention responds essentially without time delay and is independent of the brake force. During normal driving operation, the auxiliary spring and the thrust rod are located on the side of the spring-supported masses so that the unsprung masses can hardly increase by this system.

These and other objects, features and advantages of the present invention will become more apparent from the following description when taken in connection with the accompanying drawing which shows, for purposes of illustration only, one embodiment in accordance with the present invention, and wherein:

The single FIGURE is a side elevational view, partly in cross section, of a front wheel suspension for a motorcycle in accordance with the present invention.

Referring now to the single FIGURE of the drawing, a front wheel suspension for a front wheel 1 of a motorcycle can be readily recognized therefrom. The suspension essentially consists of a front wheel fork generally designated by reference numeral 2, whose two fork legs are constructed as telescopic shock absorbers. The drawing illustrates the front wheel with the suspension in side view so that only one fork leg can be seen. However, the two legs insofar as the invention is realized thereat, are constructed identically. Each fork leg includes a tubular slide member 3 which forms at its one end a bearing place for the axle shaft 4 of the front wheel 1. The other open end of the tubular slide member 3 receives a support pipe 5 which is adapted to be telescoped into the tubular slide member 3 against the force of a compression spring 6. The compression springs 6 in each leg form together the spring element in the sense of the present invention. At their end sections 5a opposite the tubular slide member 3, the two support pipes 5 are held together by way of two fork bridges 7 and 8. The sections 5a and the fork bridges 7 and 8 form the steering head which is provided with a pipe 9 for the rotatable connection of the wheel fork at the frame of the motorcycle.

The front wheel 1 is equipped with a disk brake 10 which cooperates with a brake caliper 11 pivotally connected at the tubular slide member 3. The pivot shaft therefor is designated by reference numeral 12. An abutment 3a at the tubular slide member 3 limits the rotary movement of the brake caliper 11 in the clockwise direction. It should be noted in that connection that the fork leg which cannot be seen in the drawing may also include a disk brake. For the sake of simplicity, however, the description will refer only to one disk brake though it is understood that two such disk brakes may be provided.

A bore 13 extends in parallel to the pipe axis of the tubular slide member 3. A valve body 14 closes the lower opening of the bore 13. A thrust rod 15 extends displaceably into the oppositely disposed opening.

The thrust rod 15 includes saw-tooth-like notches 16 in its section disposed in the bore 13. The notches 16 are so constructed that the saw teeth point downwardly in the direction toward the axle shaft 4. On the side outside the bore 13, the thrust rod 15 carries a piston 17.

The piston 17 represents one part of a gas spring generally designated by reference numeral 18, whose other part is formed by a gas cylinder 19 filled with compressed gas and secured at the fork bridges 7 and 8. The piston 17 can be pushed into the gas cylinder 19 by way of the connecting rod 15, whereby the displacement direction is parallel to that of the support pipe 5.

The tubular slide member 3 forms a pipe-flanged-shaped connecting stub 20 along its circumference on the side of the through-bore 13. The bore of the connecting stub 20 extends approximately perpendicularly to the longitudinal axis of the tubular slide member 3 and terminates in the bore 13 guiding the thrust rod 15. A cup-like sleeve 21 is guided within the connecting stub 20. The sleeve 21, in turn, accommodates a displaceable bolt 22 which is supported at the sleeve bottom by way of a compression spring 23. The displacement travel of the bolt 22 is limited by an abutment in the sleeve 21, against which it abuts by means of an annular collar 22a. The abutment may be formed by a snap ring or the like or by an internal shoulder. In the case of the internal shoulder, however, the sleeve bottom has to be detachable for the insertion of the bolt 22.

The bolt 22 points with its end face toward the thrust rod 15 and more particularly toward its end section provided with the saw-tooth-like notches 16. The notches 16 are formed by a flank directed inwardly approximately radially to the longitudinal axis of the thrust rod 15, which is adjoined by a flank extending obliquely downwardly and outwardly. The end face of the bolt 22 is formed complementary to the inclined flank.

The sleeve 21 includes an external annular collar 21a at its sleeve bottom, which projects beyond the pipe-shaped connecting stub 20. A spring 24 is arranged between this projecting area and the wall of the tubular slide member 3, which presses the sleeve 21 with the outer side of its sleeve bottom against a finger-like extension 11a of the brake caliper 11.

The braking condition is illustrated in the drawing. The brake caliper 11 has rotated in the direction of the arrow as a result of the applied brake torque and has pressed with its finger-like extension 11a the bolt 22 into the bore 13 by way of the sleeve 21. The annular collar 21a thereby abuts against the end face of the pipe-shaped connecting stub 20 and as a result thereof delimits the rotary movement of the brake caliper 11. The bolt 22 blocks the thrust rod 15. If the front wheel had already slightly spring-deflected inwardly prior to the actuation of the brake, the bolt 22 would have engaged in one of the notches 16. During the beginning telescoping movement of the fixed support pipe 5 into the tubular slide member 3, the blocked thrust rod 15 pushes the piston 17 against the gas pressure into the gas cylinder 19. The spring system of the suspension will be stiffened thereby since the gas spring 18 effective as auxiliary spring is now connected in parallel with the compression springs 5.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A front wheel suspension system for motorcycles having a front wheel fork with a fork bridge, the legs of said fork acting as telescopic shock absorbers consisting of a sliding tube member receiving an axle shaft of the front wheel and an upright pipe that can be immersed into the sliding tube against the force of a pressure spring, means being provided for the braking of the front wheel which, during the braking process, via a thrust rod, load an additional spring arranged at the fork bridge, wherein the thrust rod, during the braking process, is supported via a slideable bolt means, actuated in response to the braking means.

2. A front wheel suspension according to claim 1, characterized in that:
   a guide means for the thrust rod is provided at least at one tubular slide member, said guide means extending in parallel to the longitudinal axis of the tubular slide member;
   a connecting stub for the bolt means is arranged at the guide means approximately at right angle to the longitudinal axis of the tubular slide member; and
   the auxiliary spring means is secured at the fork bridge means.

3. A front wheel suspension according to claim 2, characterized in that the guide means is formed by a bore provided in the walls of the tubular slide member, in which terminates the connecting stub connected in one piece with the tubular slide member.

4. A front wheel suspension according to claim 3, with a brake disk provided at the front wheel which cooperates with a brake caliper arranged at the tubular slide member, characterized in that the brake caliper is rotatably supported at the tubular slide member in parallel to the wheel axis and acts on the bolt means with a finger-like extension.

5. A front wheel suspension according to claim 4, characterized in that the bolt means is guided inside of the connecting stub within a cup-like sleeve means and is resiliently supported at the sleeve bottom, and in that the bolt means abuts with an annular collar at a part of the sleeve means.

6. A front wheel suspension according to claim 5, wherein said part is an internal shoulder.

7. A front wheel suspension according to claim 5, characterized in that the sleeve means abuts at the outside of its sleeve bottom with the finger-like extension of the brake caliper and is supported at the tubular slide member by way of a spring slipped over the connecting stub, and in that the sleeve bottom includes an outer annular collar matched to the spring diameter.

8. A front wheel suspension according to claim 7, characterized in that the tubular slide member is provided with an abutment for the brake caliper rotating back into its starting position.

9. A front wheel suspension according to claim 8, characterized in that the thrust rod, in its end section facing the bolt means, is provided with saw-tooth-like notches having downwardly pointing teeth for the engagement of the bolt means, and in that the end face of the bolt means facing the thrust rod is constructed complementary to the inclined surface of the saw teeth.

10. A front wheel suspension according to claim 9, characterized in that the auxiliary spring means is a pneumatic spring.

11. A front wheel suspension according to claim 10, characterized in that the auxiliary spring means is formed by a gas cylinder filled with compressed gas and secured at the fork bridge means, and a piston connected with the thrust rod being displaceably guided in said fork bridge means.

12. A front wheel suspension according to claim 11, characterized in that the lower opening of the bore guiding the thrust rod is provided with a means for a throttled air discharge.

13. A front wheel suspension according to claim 1, wherein said auxiliary spring means is in parallel with the first-mentioned spring means.

14. A front wheel suspension according to claim 2, with a brake disc provided at the front wheel which cooperates with a brake caliper arranged at the tubular slide member, characterized in that the brake caliper is rotatably supported at the tubular slide member in parallel to the wheel axis and acts on the bolt with a finger-like extension.

15. A front wheel suspension according to claim 2, characterized in that the bolt means is guided within a cup-like sleeve means inside of the connecting stub and is resiliently supported at the sleeve bottom, and in that the bolt means abuts with an annular collar at a part of the sleeve means.

16. A front wheel suspension according to claim 15, characterized in that the sleeve means abuts at the outside of its sleeve bottom with the finger-like extension of the brake caliper and is supported at the tubular slide member by way of a spring slipped over the pipe-flanged shaped connecting stub, and in that the sleeve bottom includes an outer annular collar matched to the spring diameter.

17. A front wheel suspension according to claim 14, characterized in that the tubular slide member is provided with an abutment for the brake caliper rotating back into its starting position.

18. A front wheel suspension according to claim 1, characterized in that the thrust rod, in its end section facing the bolt means, is provided with saw-tooth-like notches having downwardly pointing teeth for the engagement of the bolt means, and in that the end face of the bolt means facing the thrust rod is constructed complementary to the inclined surface of the saw teeth.

19. A front wheel suspension according to claim 1, characterized in that the auxiliary spring means is pneumatic spring.

20. A front wheel suspension according to claim 2, characterized in that the auxiliary spring means is formed by a gas cylinder filled with compressed gas and secured at the fork bridge means, and a piston connected with the thrust rod being displaceably guided in said fork bridge means.

21. A front wheel suspension according to claim 2, characterized in that the lower opening of the bore guiding the thrust rod is provided with a means for a throttled air discharge.

* * * * *